(12) United States Patent
Gali et al.

(10) Patent No.: US 12,384,295 B2
(45) Date of Patent: Aug. 12, 2025

(54) VEHICULAR TRAILER ANGLE DETECTION SYSTEM FOR FIFTH-WHEEL TRAILERS

(71) Applicant: Magna Electronics Inc., Auburn Hills, MI (US)

(72) Inventors: Jyothi P. Gali, Rochester Hills, MI (US); Harold E. Joseph, Brampton (CA); Prasanna Ananthakrishnan, Tamilnadu (IN); Alexander Velichko, Toronto (CA); Guruprasad Mani Iyer Shankaranarayanan, Mississauga (CA)

(73) Assignee: Magna Electronics Inc., Auburn Hills, MI (US)

( * ) Notice: Subject to any disclaimer, the term of this patent is extended or adjusted under 35 U.S.C. 154(b) by 393 days.

(21) Appl. No.: 17/646,902

(22) Filed: Jan. 4, 2022

(65) Prior Publication Data

US 2022/0212599 A1 Jul. 7, 2022

Related U.S. Application Data

(60) Provisional application No. 63/199,513, filed on Jan. 5, 2021.

(51) Int. Cl.
*B60R 1/00* (2022.01)

(52) U.S. Cl.
CPC ........ *B60R 1/002* (2013.01); *B60R 2300/105* (2013.01); *B60R 2300/307* (2013.01); *B60R 2300/607* (2013.01); *B60R 2300/80* (2013.01)

(58) Field of Classification Search
CPC ..... B60R 1/00; B60R 1/002; B60R 2300/105; B60R 2300/307; B60R 2300/607;
(Continued)

(56) References Cited

U.S. PATENT DOCUMENTS

| 5,550,677 A | 8/1996 | Schofield et al. |
| 5,670,935 A | 9/1997 | Schofield et al. |

(Continued)

FOREIGN PATENT DOCUMENTS

| CN | 101795901 A | * | 8/2010 | ............... B60R 1/00 |
| CN | 107433905 A | * | 12/2017 | ............... B60R 1/00 |

(Continued)

*Primary Examiner* — Stephen R Koziol
*Assistant Examiner* — Benedict E Lee
(74) *Attorney, Agent, or Firm* — HONIGMAN LLP

(57) ABSTRACT

A vehicular trailer assist system includes a rearward viewing camera viewing a trailer hitched at a fifth wheel hitch at a bed of the vehicle. With the trailer hitched to the vehicle, the vehicular trailer assist system transforms fisheye-view frames of image data captured by the rearward viewing camera into bird's-eye view frames of image data. The vehicular trailer assist system determines the fifth wheel hitch within a transformed bird's-eye view frame of image data. The vehicular trailer assist system warps the transformed bird's-eye view frame of image data, which includes (i) an X-axis that indicates change in a trailer angle of the trailer relative to the vehicle and (ii) a Y-axis that indicates distance from the fifth wheel hitch. The vehicular trailer assist system, using the X-axis of the warped transformed bird's-eye view frame of image data, determines the trailer angle of the trailer relative to the vehicle.

20 Claims, 11 Drawing Sheets

(58) Field of Classification Search
CPC .......... B60R 2300/80; B60R 2300/806; B60R 2300/808; B60R 1/26
See application file for complete search history.

(56) References Cited

U.S. PATENT DOCUMENTS

| | | | |
|---|---|---|---|
| 5,949,331 A | 9/1999 | Schofield et al. | |
| 6,690,268 B2 | 2/2004 | Schofield et al. | |
| 6,985,171 B1* | 1/2006 | Kuriya | H04N 7/183 |
| | | | 396/419 |
| 7,005,974 B2 | 2/2006 | McMahon et al. | |
| 7,038,577 B2 | 5/2006 | Pawlicki et al. | |
| 7,372,996 B2* | 5/2008 | Luo | G06T 7/593 |
| | | | 382/199 |
| 7,720,580 B2 | 5/2010 | Higgins-Luthman | |
| 7,855,755 B2 | 12/2010 | Weller et al. | |
| 8,044,776 B2* | 10/2011 | Schofield | B60R 1/26 |
| | | | 348/148 |
| 8,233,045 B2* | 7/2012 | Luo | B60Q 9/005 |
| | | | 348/148 |
| 9,085,261 B2 | 7/2015 | Lu et al. | |
| 9,205,776 B2 | 12/2015 | Turk | |
| 9,446,713 B2 | 9/2016 | Lu et al. | |
| 9,533,618 B2* | 1/2017 | Zhang | B60R 1/27 |
| 9,558,409 B2 | 1/2017 | Pliefke et al. | |
| 9,609,757 B2 | 3/2017 | Steigerwald | |
| 9,866,752 B2* | 1/2018 | Zhang | G06T 15/205 |
| 9,900,490 B2 | 2/2018 | Ihlenburg et al. | |
| 9,914,333 B2 | 3/2018 | Shank et al. | |
| 10,071,687 B2 | 9/2018 | Ihlenburg et al. | |
| 10,086,870 B2 | 10/2018 | Gieseke et al. | |
| 10,089,537 B2 | 10/2018 | Nix et al. | |
| 10,154,185 B2 | 12/2018 | Sigle et al. | |
| 10,155,478 B2* | 12/2018 | Hu | G06T 7/74 |
| 10,160,382 B2 | 12/2018 | Pliefke et al. | |
| 10,179,543 B2 | 1/2019 | Rathi et al. | |
| 10,264,219 B2 | 4/2019 | Mleczko et al. | |
| 10,313,572 B2 | 6/2019 | Wohlte | |
| 10,332,002 B2 | 6/2019 | Bliss et al. | |
| 10,346,705 B2 | 7/2019 | Naserian et al. | |
| 10,407,047 B2 | 9/2019 | Chundrlik, Jr. et al. | |
| 10,452,931 B2 | 10/2019 | Gupta | |
| 10,523,865 B2* | 12/2019 | Appia | G06T 15/205 |
| 10,532,698 B2 | 1/2020 | Potnis et al. | |
| 10,552,976 B2 | 2/2020 | Diessner et al. | |
| 10,567,705 B2 | 2/2020 | Ziegenspeck et al. | |
| 10,586,119 B2 | 3/2020 | Pliefke et al. | |
| 10,638,025 B2 | 4/2020 | Gali et al. | |
| 10,706,291 B2 | 7/2020 | Diessner et al. | |
| 10,733,757 B2 | 8/2020 | Gupta et al. | |
| 10,755,110 B2 | 8/2020 | Bajpai | |
| 10,832,435 B1* | 11/2020 | Mathew | B60P 1/02 |
| 10,897,600 B1* | 1/2021 | Dabral | H04N 7/181 |
| 11,198,340 B2* | 12/2021 | Ramirez Llanos | G06T 7/579 |
| 11,628,769 B2* | 4/2023 | Lavoie | B60R 1/025 |
| | | | 280/477 |
| 11,702,017 B2 | 7/2023 | Gali et al. | |
| 11,861,878 B2 | 1/2024 | Gali et al. | |
| 11,875,575 B2 | 1/2024 | Gali et al. | |
| 2011/0050903 A1 | 3/2011 | Vorobiev | |
| 2014/0085472 A1 | 3/2014 | Lu et al. | |
| 2014/0160276 A1* | 6/2014 | Pliefke | B60R 11/04 |
| | | | 348/118 |
| 2015/0002670 A1 | 1/2015 | Bajpai | |
| 2015/0217693 A1 | 8/2015 | Pliefke et al. | |
| 2017/0050672 A1 | 2/2017 | Gieseke et al. | |
| 2017/0217372 A1 | 8/2017 | Lu et al. | |
| 2017/0254873 A1 | 9/2017 | Koravadi | |
| 2018/0211528 A1 | 7/2018 | Seifert | |
| 2018/0215382 A1 | 8/2018 | Gupta et al. | |
| 2018/0253608 A1 | 9/2018 | Diessner et al. | |
| 2018/0276838 A1 | 9/2018 | Gupta et al. | |
| 2018/0276839 A1 | 9/2018 | Diessner et al. | |
| 2018/0341823 A1 | 11/2018 | Gupta | |
| 2019/0016264 A1 | 1/2019 | Potnis et al. | |
| 2019/0039649 A1 | 2/2019 | Gieseke et al. | |
| 2019/0064831 A1 | 2/2019 | Gali et al. | |
| 2019/0118860 A1 | 4/2019 | Gali et al. | |
| 2019/0143895 A1* | 5/2019 | Pliefke | B62D 15/027 |
| | | | 348/118 |
| 2019/0347825 A1* | 11/2019 | Gupta | B60D 1/245 |
| 2020/0010019 A1* | 1/2020 | Matsuba | G06T 11/40 |
| 2020/0017143 A1 | 1/2020 | Gali | |
| 2020/0334475 A1 | 10/2020 | Joseph et al. | |
| 2020/0356788 A1 | 11/2020 | Joseph et al. | |
| 2020/0361397 A1 | 11/2020 | Joseph et al. | |
| 2020/0406967 A1 | 12/2020 | Yunus et al. | |
| 2021/0078634 A1 | 3/2021 | Jalalmaab et al. | |
| 2021/0127693 A1 | 5/2021 | Tomita et al. | |
| 2021/0170820 A1 | 6/2021 | Zhang | |
| 2021/0170947 A1 | 6/2021 | Yunus et al. | |
| 2021/0178986 A1* | 6/2021 | Falb | B60R 1/26 |
| 2022/0189052 A1 | 6/2022 | Jalalmaab et al. | |
| 2022/0212668 A1 | 7/2022 | Joseph et al. | |
| 2022/0215670 A1 | 7/2022 | Gali et al. | |

FOREIGN PATENT DOCUMENTS

| | | | |
|---|---|---|---|
| EP | 2181898 A1 * | 5/2010 | ............... B60R 1/00 |
| JP | 7044867 B2 * | 3/2022 | ............... B60R 1/00 |

* cited by examiner

VEHICULAR TRAILER ANGLE DETECTION SYSTEM FOR FIFTH-WHEEL TRAILERS

CROSS REFERENCE TO RELATED APPLICATION

The present application claims the filing benefits of U.S. provisional application Ser. No. 63/199,513, filed Jan. 5, 2021, which is hereby incorporated herein by reference in its entirety.

FIELD OF THE INVENTION

The present invention relates generally to a vehicular trailering assist system for a vehicle towing a trailer and, more particularly, to a vehicular trailering assist system that utilizes one or more cameras at a vehicle for determining trailer angle of the trailer relative to the vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

A vehicular trailer assist system includes a rearward viewing camera disposed at a vehicle equipped with the vehicular trailer assist system. The rearward viewing camera views at least a portion of a trailer hitched at a fifth wheel hitch at a bed of the vehicle and captures fisheye-view frames of image data. The rearward viewing camera may include a CMOS imaging array having at least one million photosensors arranged in rows and columns. The system includes an electronic control unit (ECU) with electronic circuitry and associated software. The electronic circuitry includes an image processor operable to process fisheye-view frames of image data captured by the rearward viewing camera. With the trailer hitched to the fifth wheel hitch at the bed of the vehicle, the vehicular trailer assist system, via image processing at the ECU of fisheye-view frames of image data captured by the rearward viewing camera, transforms fisheye-view frames of image data captured by the rearward viewing camera from fisheye-view frames of image data into bird's-eye view frames of image data. The vehicular trailer assist system determines the fifth wheel hitch within a transformed bird's-eye view frame of image data. The vehicular trailer assist system warps the transformed bird's-eye view frame of image data, and wherein the warped transformed bird's-eye view frame of image data includes (i) an X-axis that indicates change in a trailer angle of the trailer relative to the vehicle and (ii) a Y-axis that indicates distance from the fifth wheel hitch. The vehicular trailer assist system, using the X-axis of the warped transformed bird's-eye view frame of image data, determines the trailer angle of the trailer relative to the vehicle.

These and other objects, advantages, purposes and features of the present invention will become apparent upon review of the following specification in conjunction with the drawings.

DESCRIPTION OF THE PREFERRED EMBODIMENTS

Figure 1:
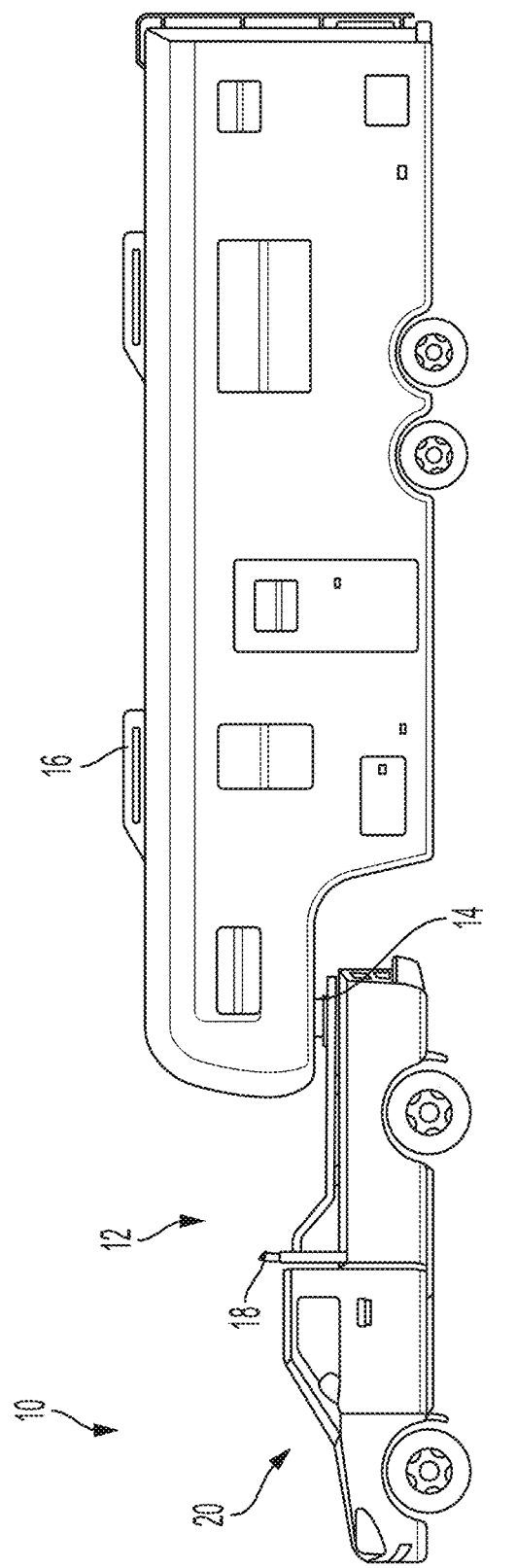
FIG. 1 is a plan view of a vehicle with a trailer assist system that is operable to determine a trailer angle of a trailer relative to a towing vehicle.

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Referring now to the drawings and the illustrative embodiments depicted therein, a vehicle 10 includes a trailer maneuver or guidance assist system or vehicular trailer assist system 12 that is operable to guide the vehicle or assist a driver of the vehicle in backing up or reversing with a hitched trailer 16. The trailer 16 is hitched to the vehicle 10 via, for example, a hitch 14. For example, the hitch couples the vehicle and trailer via a trailer coupler at the end of a trailer tongue hitching to a hitch ball of the hitch of the vehicle to establish a pivoting joint connection of the trailer to the vehicle, or a via a trailer coupler hitching to a hitching mechanism 14 located in a bed of the towing vehicle. The system 12 may guide and maneuver the vehicle 10 and trailer 16 toward a desired or selected location.

In the illustrated embodiment, the trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10 (FIG. 1). The field of view of the rearward viewing camera 18 includes the hitch 14 and/or trailer 16. The rearward viewing camera 18 includes a lens for focusing images at or onto an imaging array or imaging plane or imager of the camera. Optionally, the camera may be a center-high-mounted stop lamp (CHMSL) camera. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) 20 or processor that is operable to process image data captured by the camera or cameras and may detect objects or the like and/or provide displayed images at a display device for viewing by the driver of the vehicle (the control 20 and/or display device may be part of or incorporated in or at an interior rearview mirror assembly of the vehicle, or the control and/or the display device may be disposed elsewhere at or in the vehicle). The lens may comprise a wide angle or fisheye lens and the camera may capture fisheye-view frames of image data for processing at the ECU. The data transfer or signal communication from the camera to the ECU may comprise any suitable data or communication link, such as a vehicle network bus or the like of the equipped vehicle. The image data may be communicated to the ECU via a coaxial cable, such as by utilizing aspects of the systems described in U.S. Pat. Nos. 10,567,705; 10,313,572; 10,264,219; 10,154,185; 10,089,537; 10,071,687; 9,900,490 and/or 9,609,757, which are hereby incorporated herein by reference in their entireties.

Figure 2A:
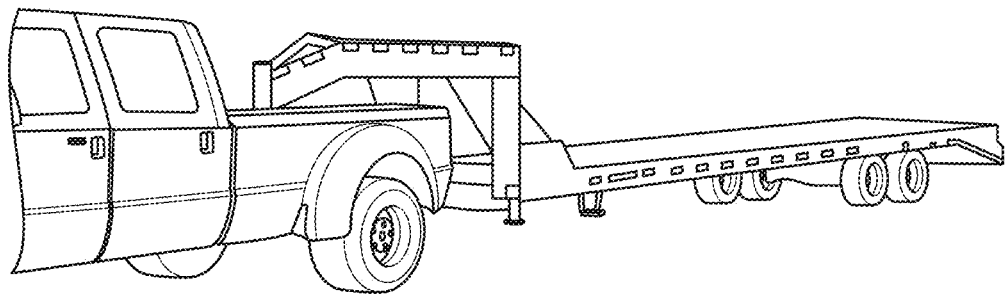
FIGS. 2A and 2B are perspective views of towing vehicles towing bed-hitched trailers.
Figure 2B:
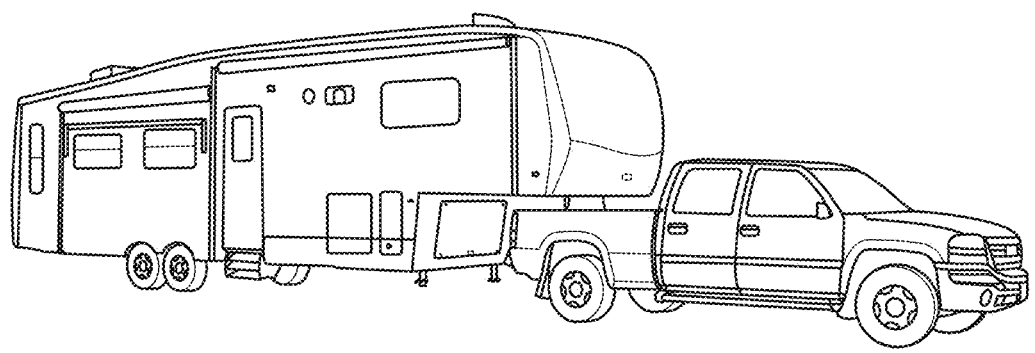
Figure 3A:
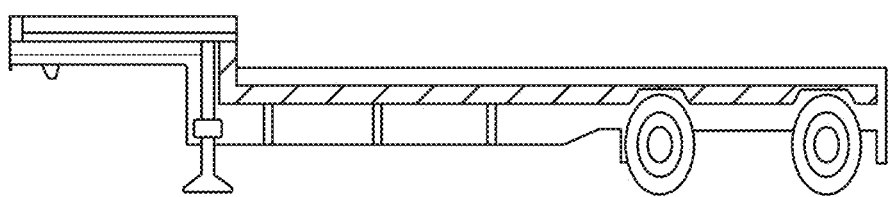
FIGS. 3A and 3B are perspective views of gooseneck trailers.
Figure 3B:
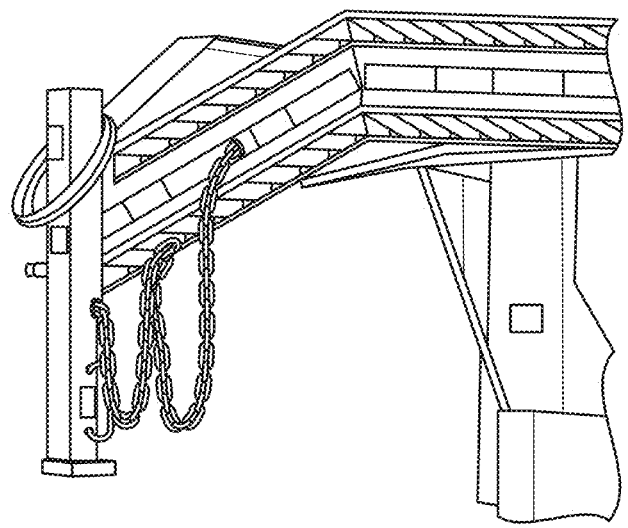
Figure 4:
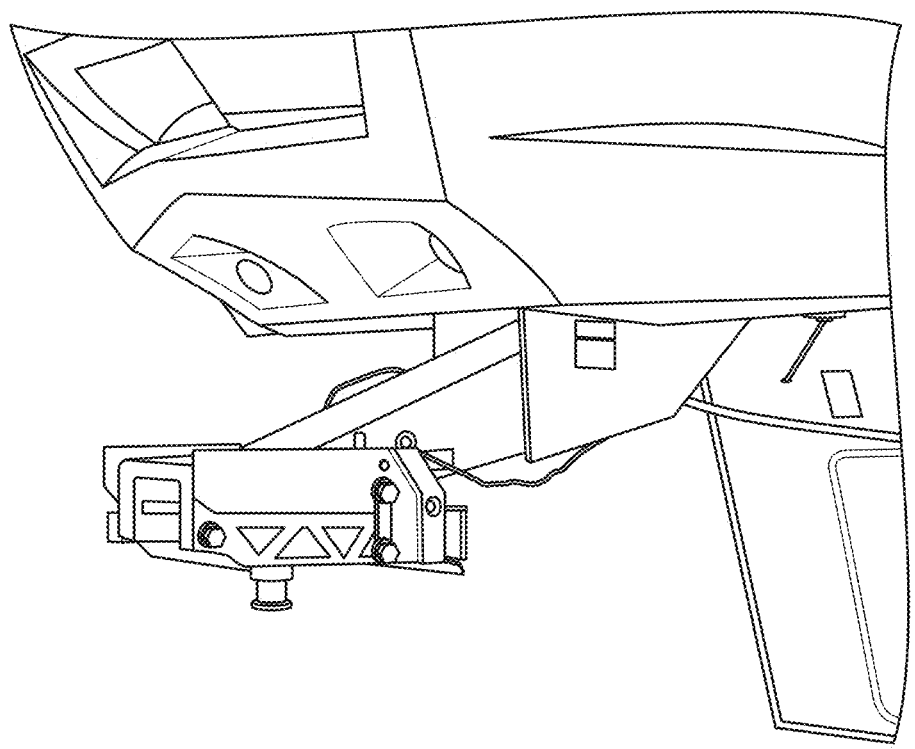
FIG. 4 is a perspective view of a fifth wheel hitch.

Vision based detection and tracking of a trailer angle (i.e., the angle of a longitudinal axis of the trailer relative to a longitudinal axis of the vehicle measured, for example, at a hitch-point of the trailer to the vehicle) for nonconventional trailers such as gooseneck trailers (FIGS. 2A, 3A, and 3B) and fifth wheel campers (FIGS. 2B and 4) is important for trailer backup assistance systems and autonomous trailer parking features. The typical size and weight of these campers and trailers make maneuverability more difficult and dangerous than typical trailers. These trailers often need the help of an additional person for safe or effective operation because, unlike conventional trailers, fifth wheel trailers, gooseneck trailers, and the like are attached or hitched to the bed of the rear trunk of the towing vehicle (e.g., a pickup truck). The hitches used for connecting these trailers to the towing vehicle have three degrees of freedom which add to the complexity of operation of these trailers.

Figure 5A:
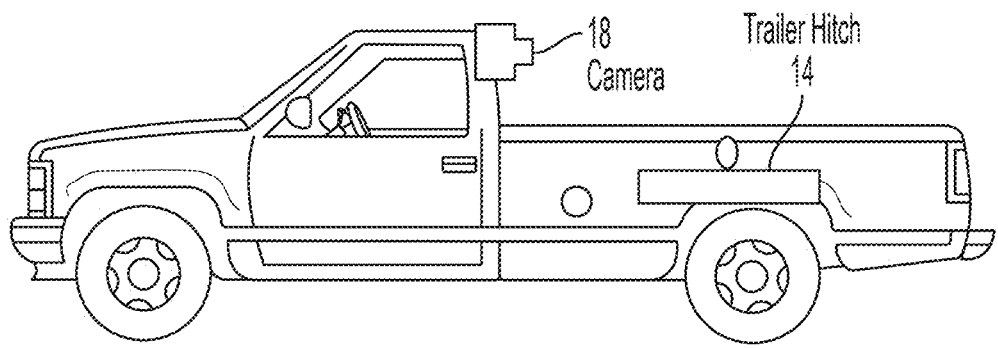
FIG. 5A is a schematic view of a vehicle equipped with a center high-mounted stop lamp camera.

Implementations herein are directed toward a vehicular trailer guidance system 12 includes contactless vision sensor-based detection of the trailer angle relative to the vehicle using one or more CHMSL cameras 18 of a towing vehicle (FIG. 5A). The CHMSL camera(s) 18 are mounted, for example, at or on or near the top or roof of the towing vehicle and overlook the rear bed of the towing vehicle. Thus, the CHMSL camera 18 has a field of view rearward of the vehicle and optionally downward from the roof or upper portion of the cab of the vehicle (with the rearward view of the CHMSL camera being different than a rearward view of a rear backup camera of the vehicle). The CHMSL camera views 18 at least a portion of the hitch 14 of the vehicle and, when the trailer 16 is hitched to the vehicle (e.g., via a trailer hitch 14 within a bed of the vehicle), at least a portion of the hitch and body of the trailer. Herein, a trailer refers to any vehicle that is configured to be towed such as a camper or recreational vehicle. The system processes image data captured by the CHMSL camera 18 to detect and calculate the trailer angle of the trailer 16.

Figure 5B:
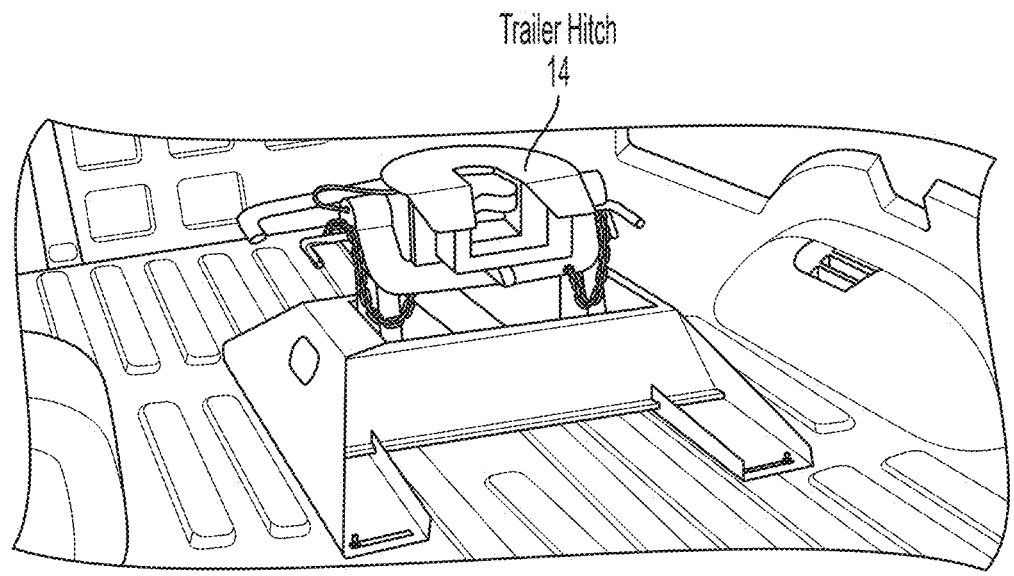
FIG. 5B is a perspective view of a bed-mounted hitch.

The system may accommodate different height and shaped trailers, hitches, and towing vehicles. The system may also cater to various illumination conditions (e.g., full sun, shade, dusk, night, etc.). The system is capable of working with all types of hitch types (i.e., both fixed and moving hitch types). The system may support two or more degrees of motion and also cater to tilt in the hitch at various angles. The system may also support trailer angles up to 90 degrees on either side of the vehicle (i.e., the longitudinal axis of the trailer is perpendicular to the longitudinal axis of the vehicle). The system implements a technique to resolve the various challenges that face hitching and towing bed-hitched trailers such as fifth wheels, goosenecks, etc. (FIG. 5B) to accurately determine the trailer angle.

Figure 6:
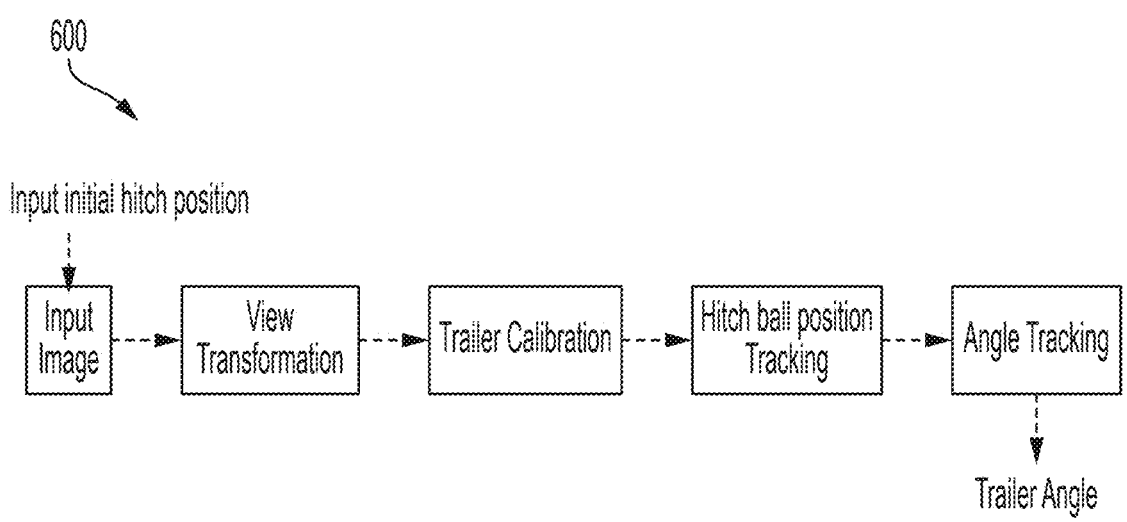
FIG. 6 is a block diagram of a technique for determining the trailer angle relative to the vehicle.

Referring now to FIG. 6, the technique 600 includes, as discussed in more detail below, receiving an input image (e.g., captured by the CHMSL camera) and performing a view transformation on the received image. The technique includes performing trailer calibration using the transformed image and tracking the hitch ball position based on the transformed image. After tracking the hitch ball position, the technique 600 includes tracking the trailer angle based on the hitch ball position.

A central concept surrounding the trailer angle detection (TAD) technique is template matching. The template matching technique uses edges detected in a top-down view (i.e., a bird's-eye view) of the trailer (FIG. 7) and hitch area surrounding the coupler. As shown in image 710 of FIG. 7, the top-down view is created using an image captured by the rear camera 18. For example, the system performs a view transformation on an image captured by the CHMSL camera. In other words, the system receives image data captured by the CHMSL camera, which has a field of view rearward and downward from the upper portion of the vehicle (such as the roof of the cab of the vehicle) and processes the image data to provide images that include a virtual top-down or bird's-eye-perspective view of the trailer and hitch area at the bed of the truck. The system extracts edges from this transformed top-view using, for example, a modified Canny algorithm (i.e., a Canny edge detector) and calculates thresholds dynamically based on a level of brightness and contrast in the image. The system performs template matching using a dynamically created template so as to adapt to any environment and any type of trailer, completely independent of the shape of the trailer.

Figure 7:
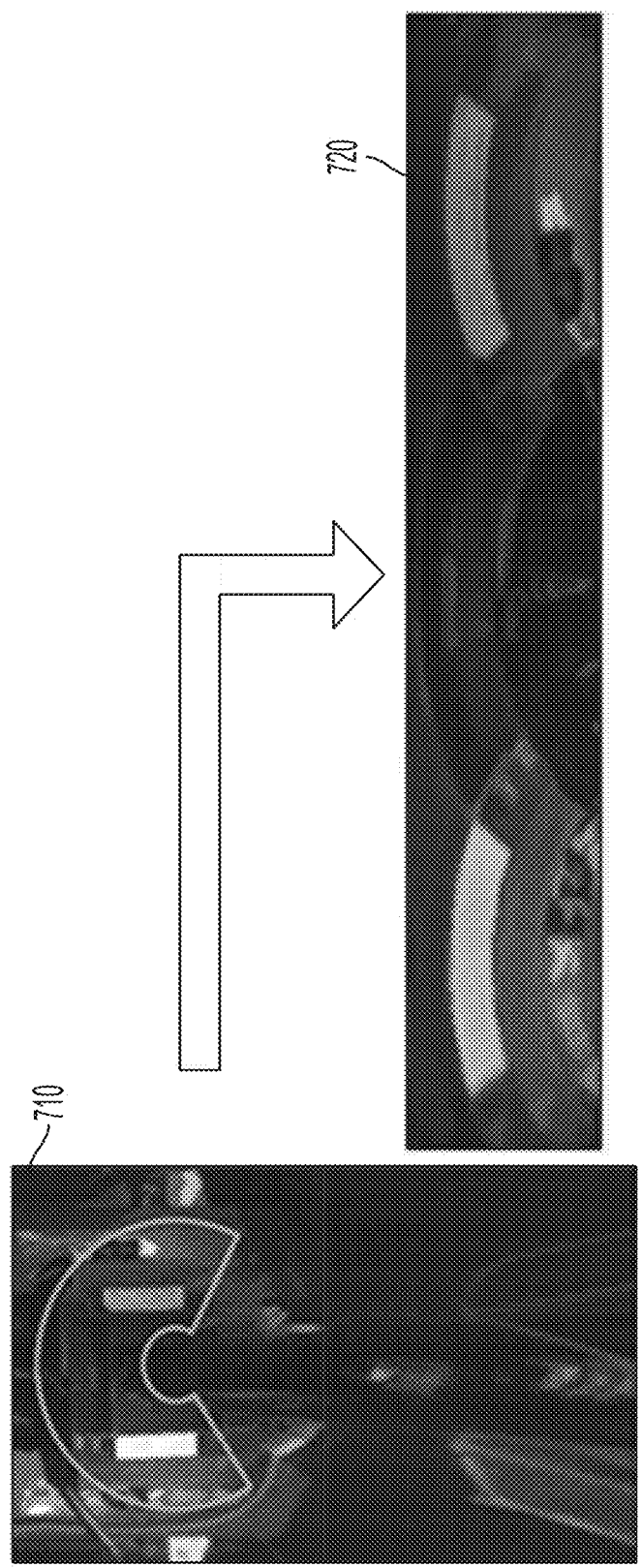
FIG. 7 is an exemplary bird's-eye view frame of image data and a corresponding warped frame of image data that allows the trailer angle to be tracked along the X-axis of the warped image data.

To make the template matching easier, the system 12 assumes that the angle of a trailer relative to the vehicle rotates around a single point (i.e., the hitch point) and uses a unique solution which is referred to herein as "warping." The system detects all trailer angles of the trailer using a single rotationally independent template. This is achieved with the system first detecting the hitch-point (or the point around which the trailer seems to rotate) and then "warping" the edges output by the Canny algorithm, such that the resulting image appears to be in polar coordinates with movement along the X-axis representing a change in angle and movement along the Y-axis representing a change in distance from the hitch-point. That is, the warped image is such that moving a vertical line along its X-axis simulates a straight beam (i.e., the longitudinal axis of the trailer) rotating around the hitch-point. FIG. 7 illustrates warping the top-down image 710 (i.e., an image captured by the camera 18 and transformed into a bird's eye view perspective) into the warped image 720. As shown, a radial area surrounding the hitch-point in the top-down image 710 is transformed into a linear area in the warped image 720, along which movement of the trailer may be tracked to determine the angle of the trailer relative to the vehicle. Because of this, template matching, and by extension angle detection, becomes the much simpler problem of finding the position of the trailer along a single axis (as opposed to two axes). As the hitch point is moving dynamically (i.e., along the single axis of the linear area of the warped image), a hitch ball tracking algorithm may track the hitch point along with trailer angle detection.

Optionally, the TAD system (i.e., that executes the TAD technique) includes a calibration state and a tracking state. When in the calibration state, the system may process image data captured by the camera to develop or build a template for subsequent tracking of the trailer angle in the tracking state. The system may begin the calibration state responsive to a user input beginning the calibration state or the system may begin the calibration state responsive to determining that a new trailer (i.e., a trailer that is not recognized by the system or does not have a corresponding previously recorded calibration saved) is at or rearward of or hitched to the vehicle. For example, the system may determine when a new trailer has been hitched to the vehicle (e.g., the trailer has never been previously hitched to the vehicle). When the new trailer is hitched, the system may require the driver to complete a calibration phase to provide a calibration to the system. When the trailer has been previously hitched to the vehicle (i.e., the combination of the trailer and the vehicle has previously been calibrated and stored), the system may skip or bypass the calibration phase by loading the result of the previous calibration. After the calibration phase is completed or if a calibration is input into the algorithm (i.e., from a previous calibration), the TAD system enters the scanning state. The purpose of the scanning state is to determine the current position of the trailer based on the calibration provided to the system. Once an initial angle of the trailer is determined, the TAD system may begin the tracking state, which will continue until shut-down (e.g., the vehicle is shut off, an occupant disables the system, etc.).

The calibration state may be separated into a "Drive Straight" sub-state, a "Turn Left or Right" sub-state, or a "Wait" sub-state. Optionally, when starting the TAD technique, the user may be required to first park or stop the vehicle and trailer as straight as possible (e.g., with a trailer angle at or near zero degrees), because the TAD system may only begin template build-up when the vehicle is stationary. When the template build-up is complete, the user may continue the calibration maneuver by driving straight. After bringing the trailer to a zero-degree trailer angle (i.e., the longitudinal axes of the trailer and the towing vehicle are aligned), the angle may correct itself and the new template will be updated.

During the tracking state, as discussed in more detail below, the angle of the trailer is continuously output.

Herein, trailer calibration refers to a portion of the calibration state that deals with creating of the edge template which is used throughout the rest of the algorithm for template matching. In other words, image data captured during the calibration state may be processed to identify edges and generate templates of the hitch-point for template matching. Trailer calibration involves two steps, each of which take place during the "Drive Straight" state. A trailer template may be built when the vehicle is stationary, then the angle of the trailer is calibrated in order to determine when the trailer is at zero degrees (i.e., the longitudinal axis of the towing vehicle and the longitudinal axis of the trailer are aligned), the trailer template is updated and the angle has been corrected. In other words, the system may determine the trailer angle when the vehicle and trailer are stationary and then, after the vehicle is driven straight to align the longitudinal axes of the trailer and vehicle, the system may determine the trailer angle again and correct the previous determination of the trailer angle.

During template build-up, while the trailer is aligned with the towing vehicle, template potential builds up based on the edges from the top-view frames of image data. In each frame of image data, the system tracks the edge pixels by storing an image of hit buffers. From this, the hit rate of each pixel is calculated over a set time frame. Then the resulting hit rate image is filtered using a specific kernel to tolerate small movement of pixels. Finally, template potential builds up wherever the hit rate for a pixel is above a certain first threshold. Once the potential of any pixel reaches the max potential, template build up ceases and a template is created using all pixels whose potential was above a second threshold.

Optionally, the template build up phase is performed over a plurality of frames of image data (e.g., 50 frames of image data). The vehicle may be driven straight for a sufficient period of time to gather an adequate number of frames of image data (e.g., 50 frames) before proceeding to the next state. This stage of the algorithm is often key, as problems in the template will result in less accurate angle detection. For this reason, the tolerance allowed by the angle calibration for the trailer angle may be constrained from being too high. The reason the template is built up over a plurality of frames is to ensure that all trailer edges are collected, while also providing time to eliminate noise. After the template is built, the user may be required to move the vehicle straight. The trailer will align at zero degree once moving forward for some distance. Once the trailer is straight, the template warping will be corrected.

Figures 8A, 8B:
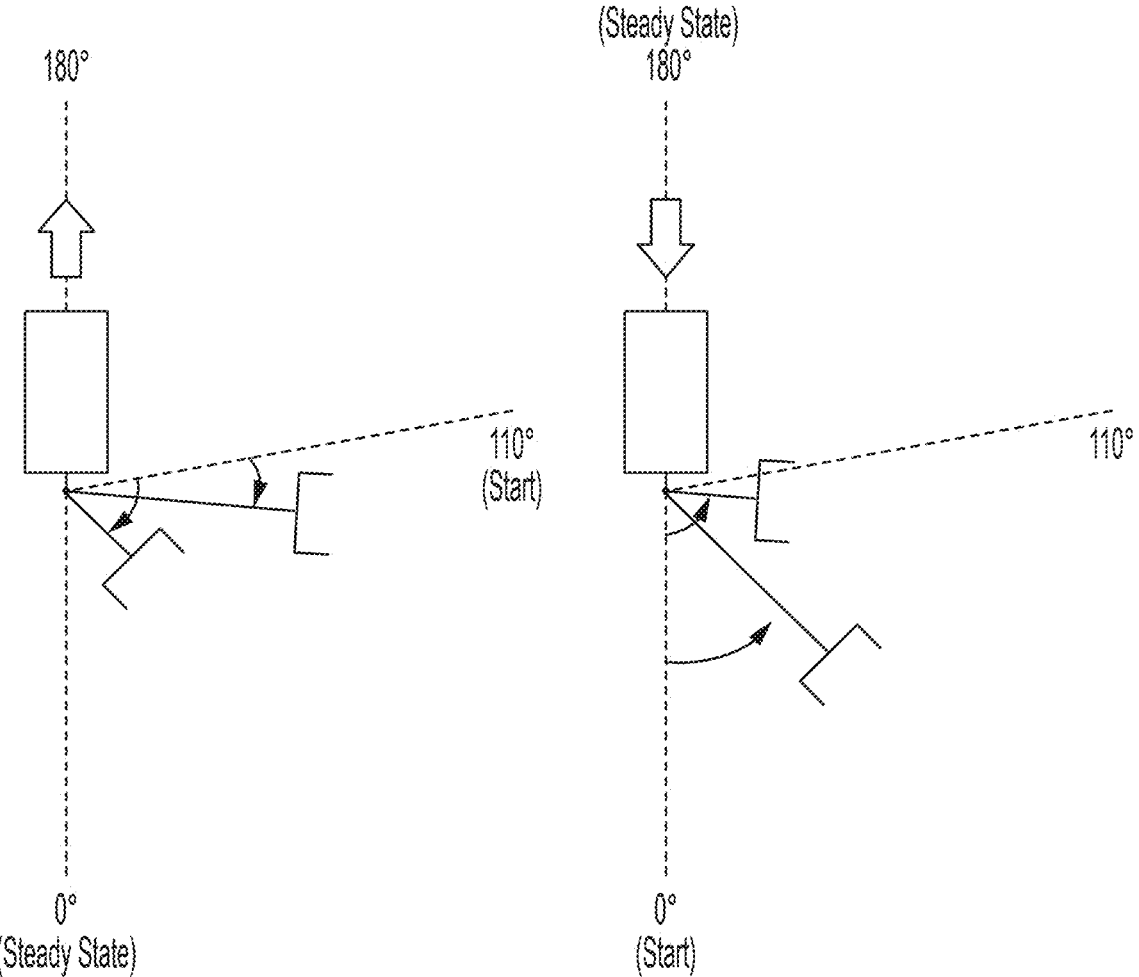
FIGS. 8A and 8B are schematic views of angle calibration of the technique for determining the trailer angle relative to the vehicle.

During the angle calibration step, to generate a good template, the system must determine the trailer angle that the trailer is at relative to the vehicle when the template is generated. The angle calibration step may assume the trailer is at any angle to start (or any angle within the set configuration, e.g., +/−110 degrees). Angle calibration may be based purely on kinematics to eliminate any error. Optionally, two kinematic models may be initialized to start at the given max angles, one on the left side and one on the right side of zero degrees (e.g., at the maximum and minimum trailer angles). These kinematic models are modified such that they will always move slower to 0 degrees than the actual trailer. Once both of these models reach 0 degrees (with some tolerance, e.g., plus or minus 5 degrees), the system assumes the trailer must also be at 0 degrees, and so template build-up may begin. That is, the system, using the kinematic models, ensures the vehicle has driven straight for a sufficient period of time to ensure that the trailer angle is at zero degrees (FIGS. 8A and 8B).

The kinematic models used to determine when the angle of the trailer is zero may use a beam-length different from the actual beam-length of the trailer as the actual beam-length of the trailer may not be known. In other words, if the beam-length of the trailer is not known, the kinematics models may substitute an estimated or standard or generic beam-length. In this scenario, the system cannot model the trailer exactly and instead makes a few assumptions. First, the system may assume the beam-length is within a given range (e.g., within 50 cm to 1000 cm or within 80 cm to 600 cm). Second, the system may assume the change in angle of the trailer as it approaches its steady state can be modelled by Equation (1).

$$\Delta\theta = \sin(\theta_s - \theta) \cdot \frac{d}{b} \tag{1}$$

In Equation (1), θ is the current angle of the trailer, $\theta_s$ is the steady state angle the trailer angle is approaching, d is the distance travelled, and b is the beam-length of the trailer. Using this, the rate of change of the trailer angle is found in Equation (2).

$$r = \frac{\Delta\theta}{d} = \sin(\theta_s - \theta)/b \qquad (2)$$

Equation (2) implies that the greater the beam-length, the slower the rate of change when assuming that the steady state angle is independent of the beam-length. Therefore, if the vehicle is driving straight (making the steady state angle 0 for all beam-lengths) then the largest beam-length will reach zero degrees last. Thus, setting the kinematic models to have the largest valid beam-length ensures that the trailer angle will be calibrated if the driver drives in a straight line for a sufficient period of time. It becomes more complicated when the driver does not drive straight, making the steady state angle non-zero and dependent of the beam-length, however, in practice, when driving forward the actual angle will still reach zero later than the kinematic model unless drastic measures are taken to ensure that it does not. However, when driving in reverse, the steady state angle becomes so large that the smaller beam-length may change so fast that driving forward and straight again may bring the larger beam-length kinematic model to 0 degrees before the actual smaller trailer. To account for this, the system sets the beam-length of the kinematic models to the smallest valid length when in reverse to keep the kinematic models farther from zero than the actual trailer.

Optionally, during the tracking state or angle detection state, the trailer angle may be "tracked" by performing a small scan around the previous frames angle to obtain the new angle for the current frame. The width of the scan determines the angle rate of change supported by the TAD system. For example, the scan may be 9 pixels across or 4 pixels on either side of the current angle. This examples allows for ~1.672 degrees movement on either side per frame, resulting in a max rate of change of 50.6 degrees per second. The size of the scan may be adjusted to account for different desired max rates of change.

Figure 9:
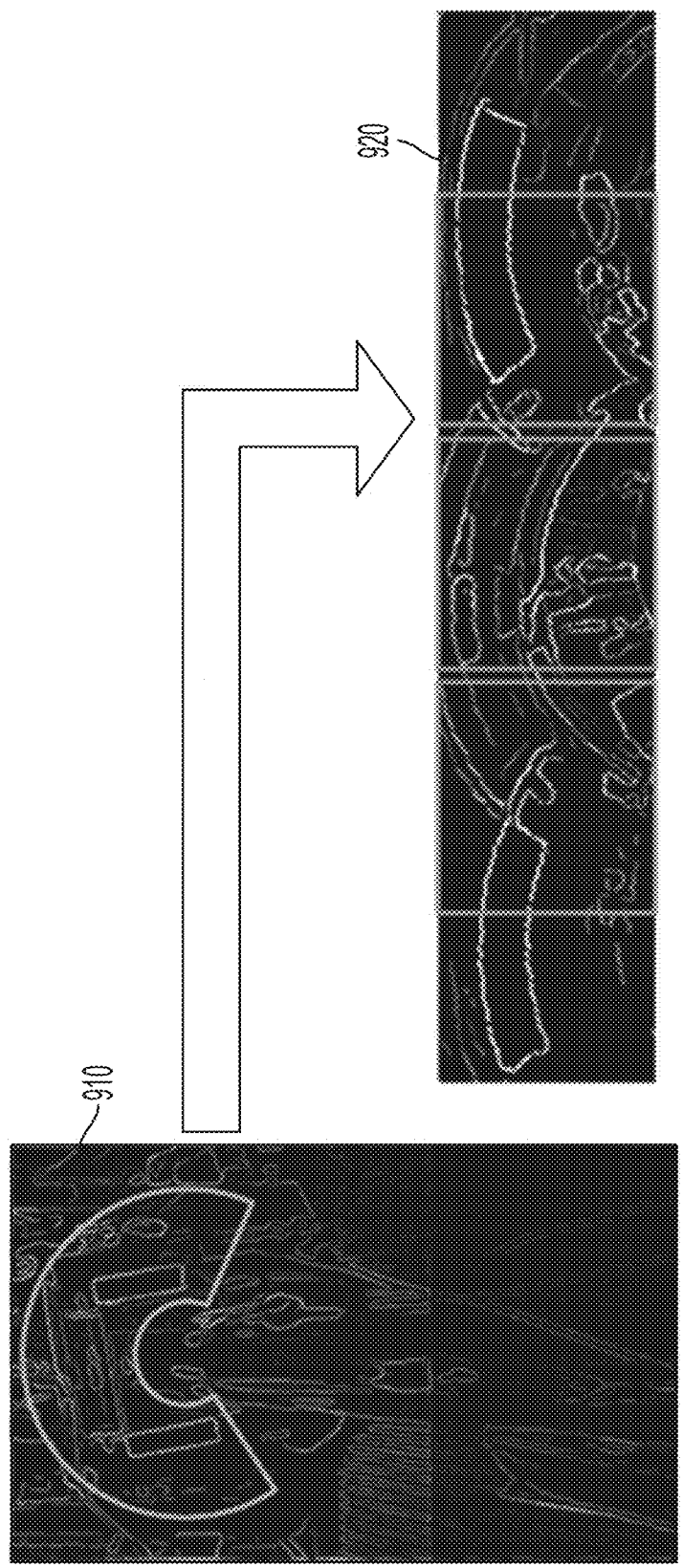
FIG. 9 is another example bird's-eye view frame of image data and a corresponding warped frame of image data.
Figure 10:
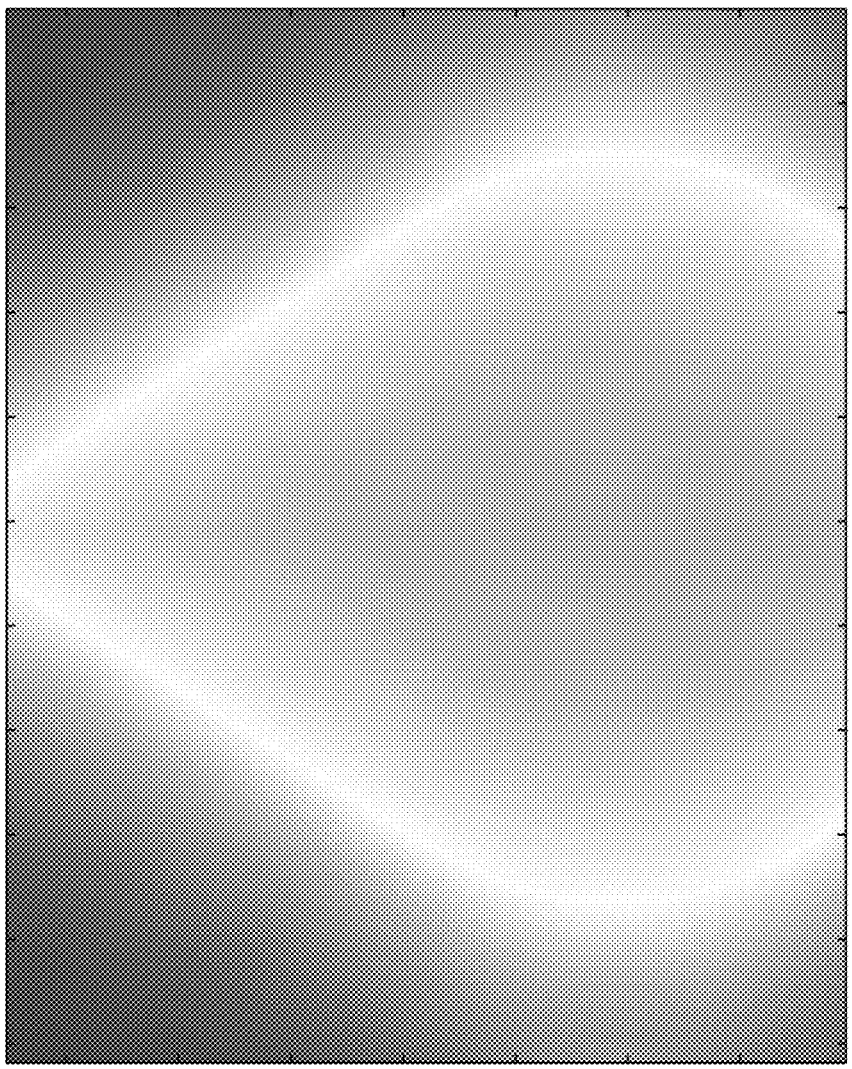
FIG. 10 is a schematic view an example template weighting mask i.

Referring now to FIG. 9, the system may perform template matching on a warped top-view. The top-view 910 is warped so that finding the X-position of the input trailer template in the warped view 920 will map directly to the angle of the trailer. In the example illustrated in FIG. 9, only part of the top-view is warped due to the scanning region whose height is exactly that of the trailer template. The gap left between the hitch-point and the scanning region is due to the fact that a slight error in the hitch-point causes the warped top-view to look greatly skewed near the hitch-point and so the system may ignore this section. The height of the scanning region is selected so as to cover much of the trailer coupler region while also accounting for such trailers that show only a small section of the coupler. This is done because the position of the top-view virtual camera is approximately above the hitch-point, which results in sections of the trailer whose real world height is above that of the hitch ball to appear to rotate at a different rate than the actual trailer. The part of the beam that is directly connected to the hitch is the best indication of the actual trailer angle, thus the goal of template matching is to match the coupler as much as possible, and the body of the trailer as little as possible. This goal is further carried out by the system applying a weighting mask to the trailer template which gives higher weight to the areas of the template that are more likely to be the coupler and lower weights to those that are more likely to be at different height (FIG. 10). In FIG. 10, the central areas of the image are weighted higher than the outer edges as the central areas are more likely to be the coupler while the edges are more likely to be the body of the trailer.

Figure 11:
FIG. 11 is a schematic view of template matching.

Due to the sensitivity of the warping transformation, unwanted distortions can appear at trailer angles significantly greater than zero, even for almost perfectly detected hitch-points. These distortions are sometimes so great that the trailer template (which was created at 0 degrees) matches just as well against a shadow or noise as it does against the actual trailer. To overcome this problem, the system may introduce a second dynamic template to account for slight distortions in the warped view as the angle of the trailer is increased. This dynamic template may be based off of the original template, but undergoes small adjustments every time the trailer angle changes. For example, the template may be adjusted every time the trailer angle changes one degree, five degrees, or ten degrees. This adjustment takes place by copying the current frames edge output, but only keeping those edges that are within a one-pixel radius of a previous edge. This dynamic template better represents what the trailer looks like at the current angle, but is also prone to error if the edges were not correctly aligned when the template was updated (which may be caused by slight errors in the detected angle). The template is only updated every, for example, five degrees in order to minimize this error. During the tracking state, both the base template and the dynamic template may be used for template matching and their scores may be combined, with extra weight being added to the base template, to determine the new angle (FIG. 11).

Thus, the TAD system outputs a final angle that represents the angle of the trailer with respect to the vehicle. The output from the TAD algorithm depends on the positon of the trailer in a warped image. For every positon there is a degree difference (depending on the number of pixels in the image). For example, there may be a 0.421875f-degree difference for every pixel in the warped image. Because the hitch may always be changing, a hitch tracking algorithm may continuously track the hitch. Hitch tracking may run parallel to the angle tracking algorithm. Hitch tracking may take a single X and Y coordinate position (i.e., the initial hitch position). With the initial hitch position, the hitch tracking algorithm tracks the coupler as it slides. The output of the hitch tracking algorithm may be sent to the angle tracking algorithm for determining the trailer angle.

Thus, implementations herein provide a contactless vision sensor-based detection of trailer angles for bed-hitched trailers (such as gooseneck trailers and fifth wheel campers). The system uses a CHMSL camera to capture image data that at least partially includes the coupler hitching the trailer to the vehicle and includes a technique for detecting and tracking the trailer angle relative to the vehicle based on the image data captured by the CHMSL camera. The system may provide the determined trailer angle to other vehicular trailer guidance systems such as systems for guiding a reversing maneuver of the trailer.

The system may utilize aspects of the trailering assist systems or trailer angle detection systems or trailer hitch assist systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2021-0170947; US-2021-0170820; US-2021-0078634; US-2020-0406967; US-2020-0361397; US-2020-0356788; US-2020-0334475; US-2020-0017143; US-2019-0118860; US-2019-0064831; US-2019-0039649; US-2018-0276838; US-2018-0215382; US-2017-0254873 and/or US-2017-0217372, and/or U.S. patent application Ser. No. 17/443,258, filed Jul. 23, 2021, now U.S. Pat. No. 11,861,878, Ser. No. 17/443,257, filed Jul. 23, 2021, now U.S. Pat. No. 11,702,017, Ser. No. 17/443,256, filed Jul. 23, 2021, now U.S. Pat. No. 11,875,575, and/or Ser. No. 17/643,596, filed Dec. 10, 2021, now U.S. Pat. No. 11,989,902, and/or U.S. provisional application Ser. No. 63/199,538, filed Jan. 7, 2021, and/or U.S. provisional application Ser. No. 63/199,514, filed Jan. 5, 2021, and/or International Publication No. WO 2021/0127693, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer assist system, the vehicular trailer assist system comprising:
a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;
wherein the rearward viewing camera comprises a CMOS imaging array having at least one million photosensors arranged in rows and columns;
an electronic control unit (ECU) comprising electronic circuitry and associated software, wherein the electronic circuitry comprises an image processor operable to process fisheye-view frames of image data captured by the rearward viewing camera;
wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;
wherein the vehicular trailer assist system determines the fifth wheel hitch within the transformed bird's-eye view frames of image data;
wherein, with the trailer hitched to the fifth wheel hitch at the bed of the vehicle, the vehicular trailer assist system warps the transformed bird's-eye view frame of image data, and wherein the warped transformed bird's-eye view frame of image data comprises (i) an X-axis where movement of the trailer within the frame of image data along the X-axis indicates change in trailer angle of the trailer relative to the vehicle and (ii) a Y-axis where position of the trailer within the frame of image data along the Y-axis indicates distance from the fifth wheel hitch; and
wherein the vehicular trailer assist system, using the X-axis of the warped transformed bird's-eye view frame of image data, determines the trailer angle of the trailer relative to the vehicle.

2. The vehicular trailer assist system of claim 1, wherein the rearward viewing camera is disposed at a center high-mounted stop lamp (CHMSL) of the vehicle.

3. The vehicular trailer assist system of claim 1, wherein the vehicular trailer assist system warps the transformed bird's-eye view frame of image data based on edges output by a Canny edge detection algorithm.

4. The vehicular trailer assist system of claim 1, wherein the vehicular trailer assist system determines the trailer angle of the trailer relative to the vehicle using template matching.

5. The vehicular trailer assist system of claim 4, wherein the vehicular trailer assist system dynamically generates a template during template matching.

6. The vehicular trailer assist system of claim 5, wherein the vehicular trailer assist system dynamically generates a template during template matching at predetermined intervals of change of the trailer angle.

7. A vehicular trailer assist system, the vehicular trailer assist system comprising:
a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;
wherein the rearward viewing camera comprises a CMOS imaging array having at least one million photosensors arranged in rows and columns;
an electronic control unit (ECU) comprising electronic circuitry and associated software, wherein the electronic circuitry comprises an image processor operable to process fisheye-view frames of image data captured by the rearward viewing camera;
wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;
wherein the vehicular trailer assist system determines the fifth wheel hitch within the transformed bird's-eye view frames of image data;
wherein, with the trailer hitched to the fifth wheel hitch at the bed of the vehicle, the vehicular trailer assist system warps the transformed bird's-eye view frame of image data, and wherein the warped transformed bird's-eye view frame of image data comprises (i) an X-axis that indicates change in trailer angle of the trailer relative to the vehicle and (ii) a Y-axis that indicates distance from the fifth wheel hitch;
wherein the vehicular trailer assist system, using the X-axis of the warped transformed bird's-eye view frame of image data, determines the trailer angle of the trailer relative to the vehicle;
wherein the vehicular trailer assist system determines the trailer angle of the trailer relative to the vehicle using template matching;
wherein the vehicular trailer assist system dynamically generates a template during template matching;
wherein the vehicular trailer assist system dynamically generates a template during template matching at predetermined intervals of change of the trailer angle; and
wherein the predetermined intervals of change are each five degrees.

8. A vehicular trailer assist system, the vehicular trailer assist system comprising:
a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;
wherein the rearward viewing camera comprises a CMOS imaging array having at least one million photosensors arranged in rows and columns;
an electronic control unit (ECU) comprising electronic circuitry and associated software, wherein the electronic circuitry comprises an image processor operable to process fisheye-view frames of image data captured by the rearward viewing camera;
wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;
wherein the vehicular trailer assist system determines the fifth wheel hitch within the transformed bird's-eye view frames of image data;
wherein, with the trailer hitched to the fifth wheel hitch at the bed of the vehicle, the vehicular trailer assist system warps the transformed bird's-eye view frame of image data, and wherein the warped transformed bird's-eye view frame of image data comprises (i) an X-axis that indicates change in trailer angle of the trailer relative to the vehicle and (ii) a Y-axis that indicates distance from the fifth wheel hitch;
wherein the vehicular trailer assist system, using the X-axis of the warped transformed bird's-eye view frame of image data, determines the trailer angle of the trailer relative to the vehicle;
wherein the vehicular trailer assist system determines the trailer angle of the trailer relative to the vehicle using template matching; and
wherein the vehicular trailer assist system dynamically determines thresholds for the template matching based on at least one selected from the group consisting of (i) a level of brightness in the warped transformed bird's-eye view frame of image data and (ii) a level of contrast in the warped transformed bird's-eye view frame of image data.

9. The vehicular trailer assist system of claim 1, wherein the vehicular trailer assist system tracks the fifth wheel hitch in consecutive frames of image data captured by the rearward viewing camera.

10. The vehicular trailer assist system of claim 1, wherein the vehicular trailer assist system tracks the trailer angle in consecutive frames of image data captured by the rearward viewing camera.

11. The vehicular trailer assist system of claim 1, wherein the trailer hitched to the fifth wheel hitch at the bed of the vehicle comprises a gooseneck trailer or a fifth wheel trailer.

12. A vehicular trailer assist system, the vehicular trailer assist system comprising:
a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;
wherein the rearward viewing camera comprises a CMOS imaging array having at least one million photosensors arranged in rows and columns;
an electronic control unit (ECU) comprising electronic circuitry and associated software, wherein the electronic circuitry comprises an image processor operable to process fisheye-view frames of image data captured by the rearward viewing camera;
wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;
wherein the vehicular trailer assist system determines the fifth wheel hitch within the transformed bird's-eye view frames of image data;
wherein, with the trailer hitched to the fifth wheel hitch at the bed of the vehicle, the vehicular trailer assist system warps the transformed bird's-eye view frame of image data, and wherein the warped transformed bird's-eye view frame of image data comprises (i) an X-axis that indicates change in trailer angle of the trailer relative to the vehicle and (ii) a Y-axis that indicates distance from the fifth wheel hitch;

wherein the vehicular trailer assist system, using the X-axis of the warped transformed bird's-eye view frame of image data, determines the trailer angle of the trailer relative to the vehicle; and wherein, when the trailer angle increases, the trailer moves along the X-axis of the warped transformed bird's-eye view frame of image data in a first direction, and wherein, when the trailer angle decreases, the trailer moves along the X-axis of the warped transformed bird's-eye view frame of image data in a second direction.

13. A vehicular trailer assist system, the vehicular trailer assist system comprising:

a rearward viewing camera disposed at a vehicle equipped with the vehicular trailer assist system, the rearward viewing camera viewing at least a portion of a trailer hitched at a hitch at a bed of the vehicle, wherein the rearward viewing camera captures fisheye-view frames of image data;

wherein the rearward viewing camera comprises a CMOS imaging array having at least one million photosensors arranged in rows and columns;

an electronic control unit (ECU) comprising electronic circuitry and associated software, wherein the electronic circuitry comprises an image processor operable to process frames of image data captured by the rearward viewing camera;

wherein, with the trailer hitched to the hitch at the bed of the vehicle, the vehicular trailer assist system, via image processing at the ECU of frames of image data captured by the rearward viewing camera, transforms frames of image data captured by the rearward viewing camera into bird's-eye view frames of image data;

wherein the vehicular trailer assist system determines a hitch point of the hitch within transformed bird's-eye view frames of image data;

wherein the vehicular trailer assist system warps the transformed bird's-eye view frame of image data, and wherein the warped transformed bird's-eye view frame of image data comprises (i) an X-axis where movement of the trailer within the frame of image data along the X-axis indicates change in trailer angle of the trailer relative to the vehicle and (ii) a Y-axis where position of the trailer within the frame of image data along the Y-axis indicates distance from the hitch point; and wherein the vehicular trailer assist system, using the X-axis of the warped transformed bird's-eye view frame of image data, determines the trailer angle of the trailer relative to the vehicle.

14. The vehicular trailer assist system of claim 13, wherein the rearward viewing camera is disposed at a center high-mounted stop lamp (CHMSL) of the vehicle.

15. The vehicular trailer assist system of claim 13, wherein the vehicular trailer assist system warps the transformed bird's-eye view frame of image data based on edges output by a Canny edge detection algorithm.

16. The vehicular trailer assist system of claim 13, wherein the vehicular trailer assist system determines the trailer angle of the trailer relative to the vehicle using template matching.

17. The vehicular trailer assist system of claim 16, wherein the vehicular trailer assist system dynamically generates a template during template matching.

18. A vehicular trailer assist system, the vehicular trailer assist system comprising:

a rearward viewing camera disposed at a vehicle equipped with the vehicular trailer assist system, the rearward viewing camera viewing at least a portion of a trailer hitched at a fifth wheel hitch at a bed of the vehicle, wherein the rearward viewing camera captures fisheye-view frames of image data;

wherein the rearward viewing camera comprises a CMOS imaging array having at least one million photosensors arranged in rows and columns;

an electronic control unit (ECU) comprising electronic circuitry and associated software, wherein the electronic circuitry comprises an image processor operable to process fisheye-view frames of image data captured by the rearward viewing camera;

wherein, with the trailer hitched to the fifth wheel hitch at the bed of the vehicle, the vehicular trailer assist system, via image processing at the ECU of fisheye-view frames of image data captured by the rearward viewing camera, transforms frames of image data captured by the rearward viewing camera from fisheye-view frames of image data into bird's-eye view frames of image data;

wherein the vehicular trailer assist system determines the fifth wheel hitch within a first transformed bird's-eye view frame of image data;

wherein the vehicular trailer assist system warps the transformed bird's-eye view frame of image data, and wherein the warped transformed bird's-eye view frame of image data comprises (i) an X-axis where movement of the trailer within the frame of image data along the X-axis indicates change in trailer angle of the trailer relative to the vehicle and (ii) a Y-axis where position of the trailer within the frame of image data along the Y-axis indicates distance from the fifth wheel hitch;

wherein the vehicular trailer assist system, using the X-axis of the warped transformed bird's-eye view frame of image data, determines the trailer angle of the trailer relative to the vehicle;

wherein, after determining the trailer angle of the trailer relative to the vehicle, the vehicular trailer assist system determines the fifth wheel hitch within a second transformed bird's-eye view frame of image data; and wherein the vehicular trailer assist system, using the second transformed-bird's-eye view frame of image data, updates the trailer angle of the trailer relative to the vehicle.

19. The vehicular trailer assist system of claim 18, wherein the first transformed bird's-eye view frame of image data and the second transformed bird's-eye view frame of image data are consecutive frames of image data captured by the rearward viewing camera.

20. The vehicular trailer assist system of claim 18, wherein the trailer hitched to the fifth wheel hitch at the bed of the vehicle comprises a gooseneck trailer or a fifth wheel trailer.

* * * * *